United States Patent [19]

Te Weng

[11] Patent Number: 5,517,386

[45] Date of Patent: May 14, 1996

[54] CAPACITOR

[76] Inventor: Shui Te Weng, P.O. Box 82-144, Taipei, Taiwan

[21] Appl. No.: 491,254

[22] Filed: Jun. 16, 1995

[51] Int. Cl.⁶ .................................................. H01G 1/14
[52] U.S. Cl. ............................ 361/321.6; 361/306.1; 361/301.1; 361/272; 361/513
[58] Field of Search ........................... 361/301.1, 301.2, 361/301.3, 301.4, 301.5, 306.1, 306.2, 320, 321.6, 326, 802, 803, 809–811, 513, 516–520, 535–539; 174/66, 50, 65 R, 61–63, 48, 135

[56] References Cited

U.S. PATENT DOCUMENTS

| | | | |
|---|---|---|---|
| 1,997,185 | 4/1935 | Sprague et al. | 361/519 |
| 2,140,443 | 12/1938 | Clark | 248/27.3 |
| 4,198,671 | 4/1980 | Donigan et al. | 361/306.1 |
| 4,424,626 | 1/1984 | Pennington | 29/839 |
| 5,162,612 | 11/1992 | Naka et al. | 174/48 |

*Primary Examiner*—Leo P. Picard
*Assistant Examiner*—Phuong T. Vu
*Attorney, Agent, or Firm*—Alfred Lei

[57] ABSTRACT

A capacitor including a cylindrical housing having a chamber for receiving an insulating material, the cylindrical housing being formed with a U-shaped slot on an upper end and a recess under the U-shaped slot, the recess being larger than the U-shaped slot thereby forming two shoulders, and an engaging member having a base having a U-shaped flange extending outwardly and slopingly from a circumference and a threaded bolt extending upwardly from a top, the engaging member being adapted to fit into the recess with the U-shaped flange fitted between the shoulders and the threaded bolt extending upwardly out of the U-shaped slot.

1 Claim, 5 Drawing Sheets

CAPACITOR

BACKGROUND OF THE INVENTION

1. Field of the Invention

This invention relates to an improved capacitor.

2. Description of the Prior Art

It has been found that the conventional capacitors on the market suffer a lot of drawbacks. FIG. 4 shows a first prior art capacitor. As illustrated, the prior art capacitor includes a cylindrical housing 1 formed with a chamber 2 in its interior for receiving an insulating material 3. The upper end of the cylindrical housing 1 is provided with a circular clamp 4 having a first opening 43 at an end and a second opening 44 at the other. A bolt 41 extends through the openings 43 and 44 to engage with a nut 42. However, such a capacitor cannot be firmly mounted on an object by the circular clamp 4 thereby causing much inconvenience in use. FIGS. 5 and 6 illustrate a second prior art capacitor including a cylindrical housing 1a having a chamber 2a in which are fitted a cap 4a, an insulating disk 3b, and an insulating material 3a. The cap 4a has an upright threaded rod extending out of the opening 2a1 of the cylindrical housing 1a. Nevertheless, it is often necessary to adjust the cap 4a so as to align it in an upright position thus increasing the cost of manual power. In addition, the insulating disc 3b will increase the manufacturing cost.

SUMMARY OF THE INVENTION

This invention relates to an improved capacitor.

It is the primary object of the present invention to provide a capacitor which can be easily and firmly connected with other objects.

It is another object of the present invention to provide a capacitor which is simple in construction.

It is still another object of the present invention to provide a capacitor which is economic to produce.

It is still another object of the present invention to provide a capacitor which is facile to manufacture.

It is a further object of the present invention to provide a capacitor which is fit for practical use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
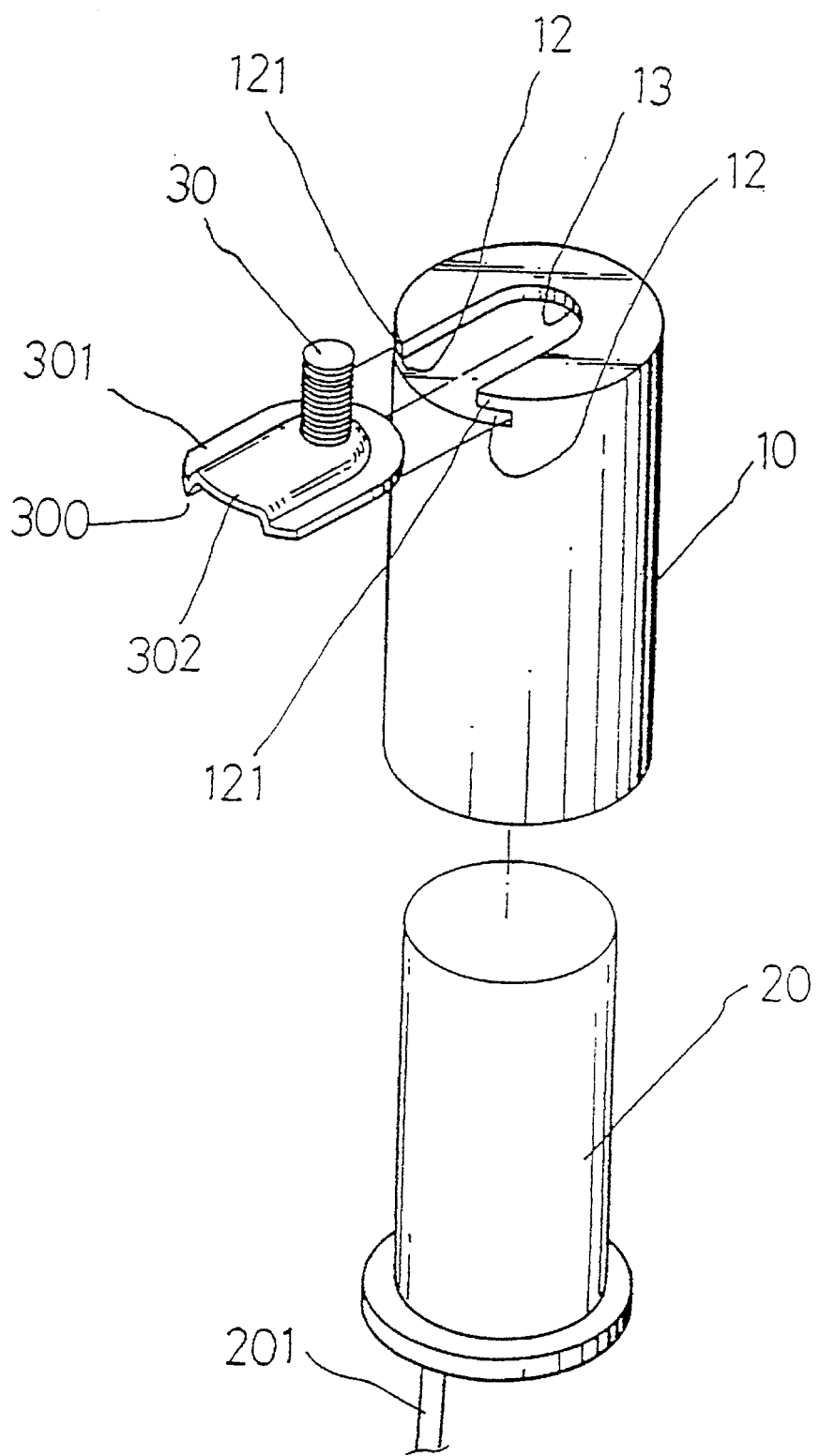
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
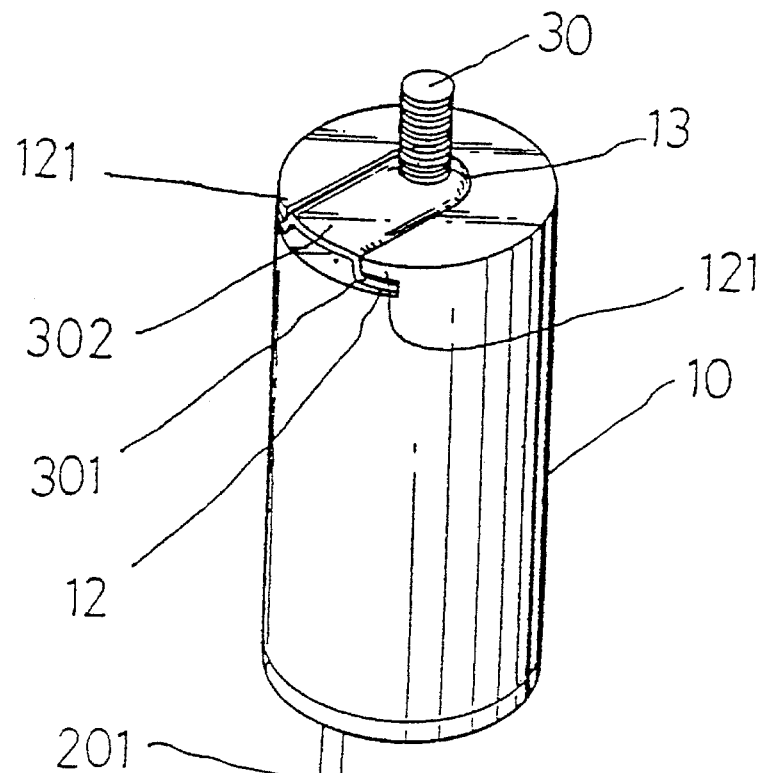
FIG. 2 is a perspective view of the present invention.
Figure 3:
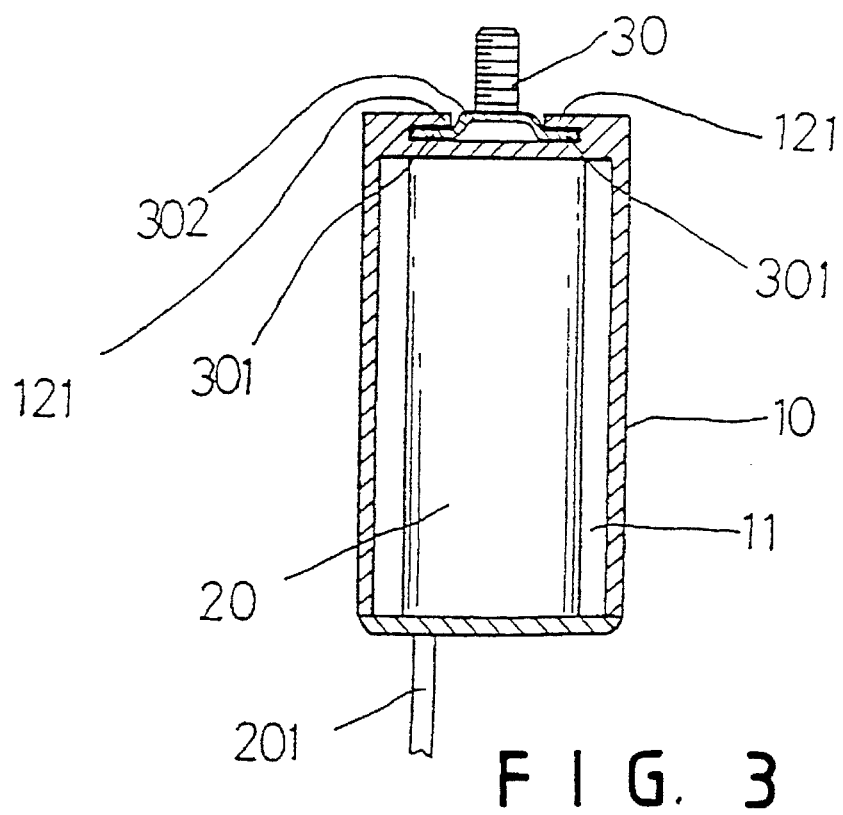
FIG. 3 is a sectional view of the present invention.
Figure 4:
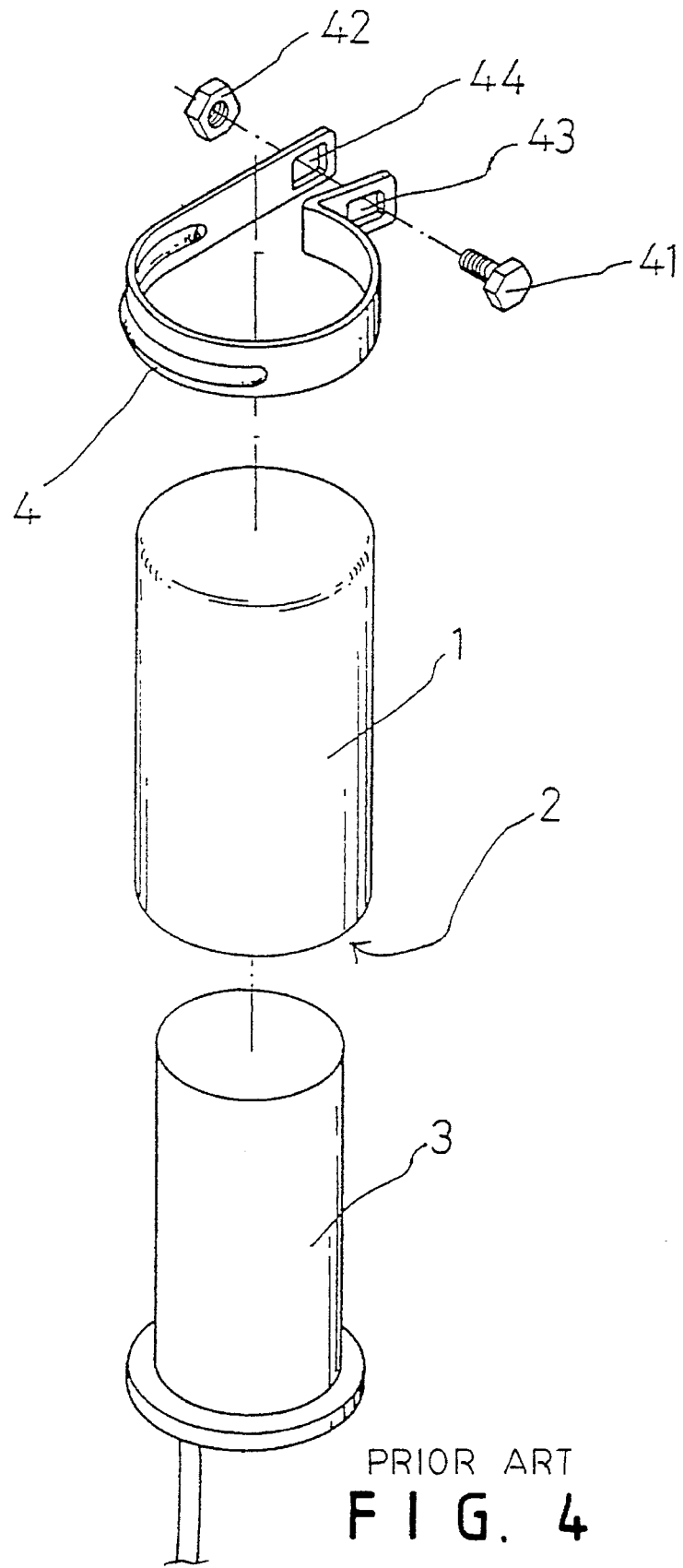
FIG. 4 is an exploded view of a first prior art cylindrical capacitor.
Figure 5:
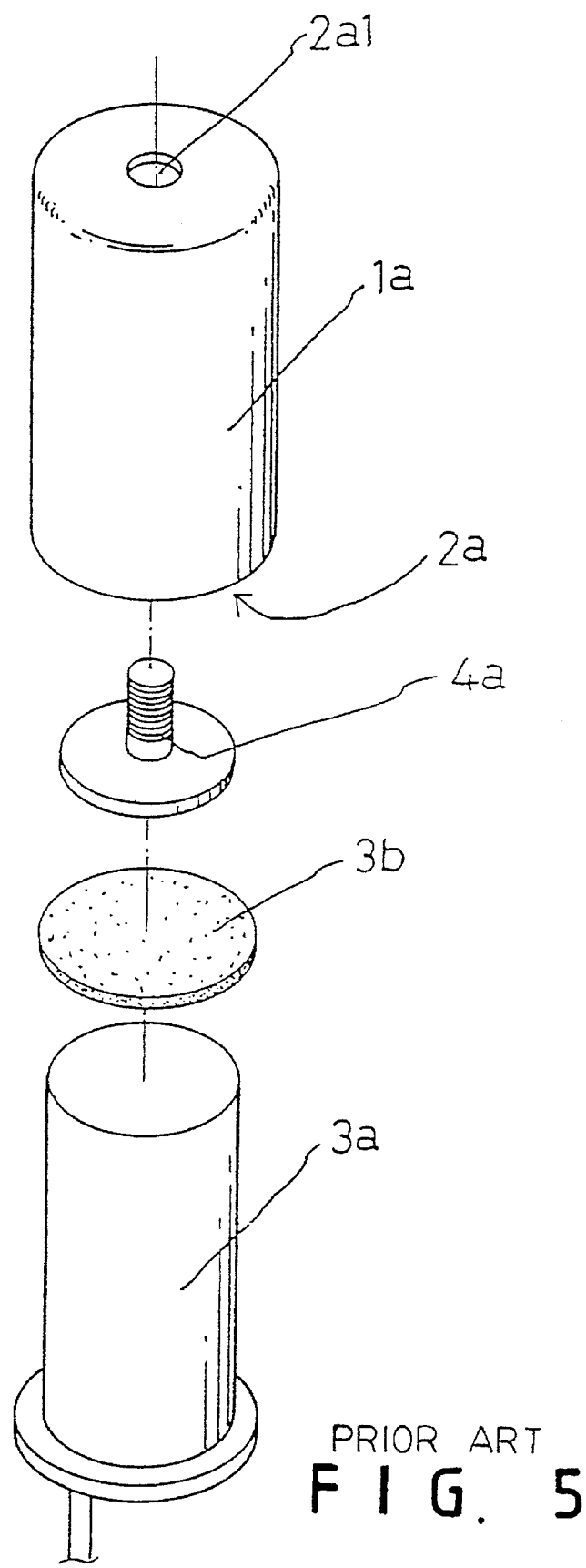
FIG. 5 is an exploded view of a second prior art cylindrical capacitor.
Figure 6:
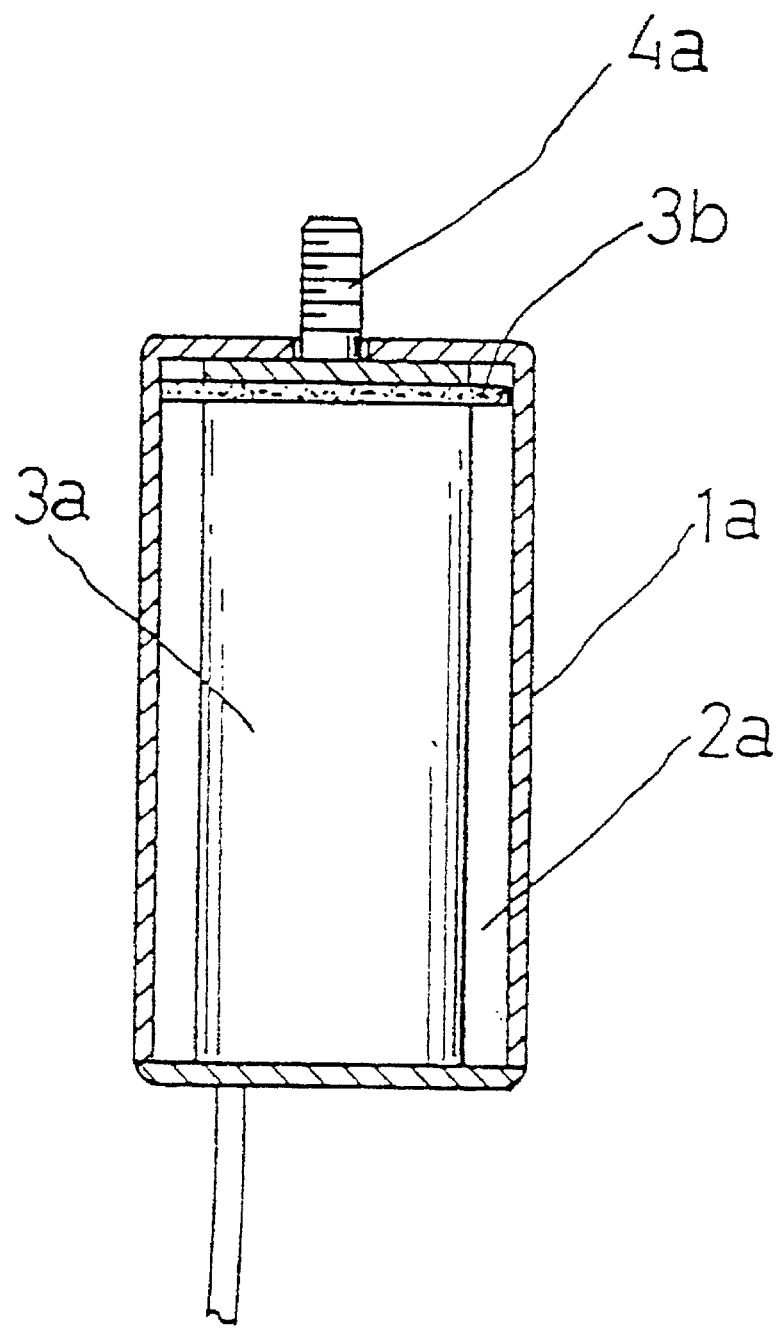
FIG. 6 is a sectional view of the second prior art cylindrical capacitor.

With reference to the drawings and in particular to FIGS. 1, 2 and 3 thereof, the capacitor according to the present invention mainly comprises a cylindrical housing 10 and an engaging member 300. The cylindrical housing 10 is a tubular member open at the bottom. The upper end of the cylindrical housing 10 is formed with a U-shaped slot 13 under which there is a recess 12. The recess 12 is larger than the U-shaped slot 13 thereby forming two shoulders 121.

An insulating material in the shape of a cylinder is fitted within the cylindrical housing 10 and has an electrical wire connected with its lower end.

The engaging member 300 includes a base 302 having a U-shaped flange 301 extending outwardly and slopingly from its circumference and a threaded bolt 30 extending upwardly from its top. When the engaging member 300 is inserted into the recess 12 of the cylindrical housing 10, the U-shaped flange 301 will be fitted under the shoulders 121 and the bolt 30 extends upwardly out of the U-shaped slot 13.

As the flange 301 extends outwardly and slopingly from the circumference of engaging member 300, the engaging member 300 will be firmly engaged with the cylindrical housing 10 when inserted therein. Hence, the bolt 30 of the engaging member 300 will be always kept at the desired upright position thereby making it unnecessary to adjust the bolt manually and therefore facilitating its connection with other objects.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A capacitor comprising:

a cylindrical housing having a chamber for receiving an insulating material, said cylindrical housing being formed with a U-shaped slot on an upper end and a recess under said U-shaped slot, said recess being larger than said U-shaped slot thereby forming two shoulders; and an engaging member having a base having a U-shaped flange extending outwardly and slopingly from a circumference and a threaded bolt extending upwardly from a top, said engaging member being adapted to fit into said recess with said U-shaped flange fitted between said shoulders and said threaded bolt extending upwardly out of said U-shaped slot.

* * * * *